(12) United States Patent
Nash et al.

(10) Patent No.: US 8,023,829 B2
(45) Date of Patent: Sep. 20, 2011

(54) DEMODULATION OF PHASE MODULATED FIBRE-OPTIC SENSOR SYSTEM SIGNALS

(75) Inventors: Philip John Nash, Surrey (GB); David John Tyler, Dorset (GB); Nicholas Middleton, Dorset (GB)

(73) Assignee: Qinetiq Limited (GB)

( * ) Notice: Subject to any disclaimer, the term of this patent is extended or adjusted under 35 U.S.C. 154(b) by 599 days.

(21) Appl. No.: 12/064,480

(22) PCT Filed: Aug. 17, 2006

(86) PCT No.: PCT/GB2006/003065
§ 371 (c)(1),
(2), (4) Date: Sep. 11, 2008

(87) PCT Pub. No.: WO2007/023260
PCT Pub. Date: Mar. 1, 2007

(65) Prior Publication Data
US 2009/0220244 A1    Sep. 3, 2009

(30) Foreign Application Priority Data

Aug. 23, 2005 (GB) ................... 0517210.1

(51) Int. Cl.
*H04B 10/00* (2006.01)
*H04B 10/04* (2006.01)
(52) U.S. Cl. ........ 398/155; 398/158; 398/185; 398/188; 398/193

(58) Field of Classification Search .......... 398/33, 398/154, 155, 158, 159, 182, 185, 188, 192, 398/193, 203, 204
See application file for complete search history.

(56) References Cited

U.S. PATENT DOCUMENTS

| 4,825,424 | A | 4/1989 | Lamb et al. |
| 6,985,192 | B1 * | 1/2006 | Bouillet et al. ............... 348/735 |
| 2006/0103766 | A1 * | 5/2006 | Temerinac et al. ........... 348/726 |
| 2008/0145063 | A1 * | 6/2008 | Li et al. ........................ 398/140 |

FOREIGN PATENT DOCUMENTS

| GB | 2 126 820 | 3/1984 |
| GB | 2 197 953 | 6/1988 |
| JP | 56154859 | 11/1981 |

OTHER PUBLICATIONS

"Implementation of DSP Carrier Recovery Using All-Digital Phased-Locked Loop with Vector Rotation Techniques for High Speed 8-PSK Modems", Jan. 1, 1999, retrieved from Internet: URL:http://www.collectionscanada.ca/.obj/s4/ f2/dsk2/ftp01/MQ36046.pdf> [retrieved on Jan. 5, 2007], pp. 24-38.

* cited by examiner

*Primary Examiner* — Dalzid Singh
(74) *Attorney, Agent, or Firm* — McDonnell Boehnen Hulbert & Berghoff LLP

(57) ABSTRACT

Demodulation apparatus for demodulating phase-modulated signals comprises a quadrature signal generator (QSG) for generating in-phase (I) and quadrature-phase (Q) signals in response to an unmodulated input signal. The QSG provides fast frequency tracking of the input signal and excludes any high-frequency content the input signal.

28 Claims, 6 Drawing Sheets

DEMODULATION OF PHASE MODULATED FIBRE-OPTIC SENSOR SYSTEM SIGNALS

BACKGROUND OF THE INVENTION (1) Field of the Invention

The invention relates to demodulation apparatus for demodulating phase-modulated signals and to fibre-optic sensor systems incorporating demodulation apparatus.

(2) Description of the Art

Phase-modulated signals arise in numerous systems, for example in communications systems and sensing systems. Demodulation of such a signal typically involves its combination with an unmodulated signal at a demodulator (e.g. a mixer) to generate a demodulated output signal having an amplitude or magnitude that depends only on the phase of the modulated signal, as in homodyne or heterodyne detection for example. Frequently, the same unmodulated signal is used both to generate the modulated signal (e.g. by passing it to a sensor which carries out phase-modulation in sympathy with conditions in the sensor's vicinity) and for combining with the modulated signal. In a time-division multiplexed (TDM) serial array of fibre-optic sensors, optical pulses from a particular sensor may be selected for analysis by demultiplexing, detected at a photodetector and the resulting signal input to a demodulator together with a unmodulated signal.

One common type of demodulator is the phase-quadrature demodulator which requires input of in-phase (I) and quadrature (Q) unmodulated signals of the substantially the same frequency as the phase-modulated signal in order to provide demodulation. Normally such signals are generated from a single unmodulated signal (for example by use of a Hilbert-transform filter) in which case the means for generating the I and Q signals must be able to adjust the frequency of these signals in response to changes in the frequency of the single unmodulated signal (and hence also that of the modulated signal.) If the speed of adjustment is too slow, the demodulator's output does not consistently reflect the phase of the modulated signal.

SUMMARY OF THE INVENTION

It is an object of the invention to ameliorate this problem. According to one aspect of the invention this object is achieved by a quadrature signal generator (QSG) for receiving an input signal and generating in-phase (I) and quadrature-phase (Q) signals of substantially the same frequency as the input signal in response thereto, wherein the QSG comprises (i) a first portion for generating a first intermediate signal in response to input of the input signal, the first intermediate signal having an amplitude or magnitude proportional to the difference between the frequency of the input signal and the frequency of the I and Q signals;

(ii) a second portion for generating a second intermediate signal in response to input of the first intermediate signal, the second intermediate signal having a magnitude proportional to the rate of change of the magnitude of the first intermediate signal; and (iii) a signal generator for generating the I and Q signals in response to input of the second intermediate signal and adjusting the frequency of the I and Q signals such that said frequency tends towards that of the input signal, the signal generator being arranged for feedback of the I and Q signals to the first portion.

Since the second intermediate signal has an amplitude or magnitude proportional to the rate of change of the difference between the frequency of the input signal and that of the I and Q signals, a fast second-order correction of the frequency of the I and Q is provided in addition to frequency tracking of the input signal by the I and Q signals.

Conveniently, the QSG is implemented in digital electronics and further comprises an analogue-to-digital converter (ADC) arranged to digitise an input signal prior to its input to said first portion.

Preferably the first portion comprises a digital phase-quadrature demodulator (DPQD) arranged to receive the digitised input signal and the I and Q signals and having its output connected to the input of a rate down-converter the output of which is connected to the input of a digital differentiator having a cut-off frequency which excludes high-frequency content in the input signal. This is particularly beneficial where the input signal is obtained by mixing two higher-frequency RF signals at a mixer: high frequency noise in the input signal due to the non-linearity of the mixing process is not present in the I and Q signals. Where the I and Q signals are input to demodulator in order to demodulate another signal, the demodulator output is not degraded by this noise.

Conveniently, the second portion comprises
(i) a inverting amplifier arranged to receive the first intermediate signal;
(ii) a summer having a first input connected to the output of the amplifier; and
(iii) delay means connected between the output of the summer and a second input thereof;
the output of the summer being input to the signal generator.

In order to provide stable operation of the system during start-up, the second portion preferably further comprises an initialisation switch and a start buffer, said switch being connected to the output of summer and the delay means connecting the output of the switch to the second input of the summer, the output of the initialisation switch being input to the signal generator and being controllable by the start buffer. This arrangement allows a control signal to be supplied to the signal generator during start-up of the system, allowing the system to converge to stable operation.

Conveniently the signal generator is a direct digital synthesiser (DDS) arranged to generate the I and Q signals in response to input of the second intermediate signal.

The QSG may further comprise a rate downconverter and a second signal generator, the downconverter being arranged to receive the second intermediate signal and to output a downconverted signal to the second signal generator which is arranged to provided second I and Q output signals in response to input of the downconverted signal. This arrangement provides for the QSG to be clocked at a different rate to another system (e.g. a quadrature phase-demodulator) with which it is used, thus providing greater operational flexibility. Conveniently, the second signal generator is a direct digital synthesiser.

Another aspect of the invention provides demodulation apparatus comprising a QSG of the invention. Preferably, demodulation apparatus of the invention further comprises a quadrature phase-demodulator arranged to receive the I and Q signals output by the QSG. In operation, an unmodulated signal is provided to the QSG and a phase-modulated signal is input to the quadrature phase-demodulator. The output of the demodulation apparatus reflects the phase information in the modulated signal with a high degree of accuracy and consistency, due to rapid frequency-tracking of the unmodulated signal by the I and Q signals.

A further aspect of the invention provides fibre-optic sensing apparatus comprising demodulation apparatus of the invention. The fibre-optic sensing apparatus may comprise a serial array of substantially identical individual fibre-optic sensors each incorporating reflecting means for reflecting radiation towards the input of the array after passage of the radiation through a corresponding individual fibre-optic sensor. Light within each sensor may be phase-modulated in sympathy with vibrations detected by the sensor.

Conveniently, each reflecting means may be a fibre-coupled mirror coupled between two individual fibre-optics sensors.

One of the individual sensors may be desensitised (for example by mechanically desensitising it) so that it does not detect the type of signals required to be detected by the sensing apparatus but does detect noise. By using a signal from this sensor as an input to the QSG of the demodulation apparatus instead of using a completely unmodulated signal, a low-noise signal maybe obtained on the output of the quadrature phase-demodulator.

Interrogation of the serial array of fibre-optic sensors may be carried out by providing means for generating pairs of at least partially coherent optical pulses in response to first, and second RF signals having a frequency difference $\Omega$, and means for inputting the pairs of pulses to the array, wherein the pulses of each pair have frequency difference $\Omega$ and a relative delay $\tau$ and the difference in path length from consecutive reflecting means to the input of the array is substantially $c\tau/2$, where c is the speed of pulses in the fibre. When a pair of pulses is input to the serial array of fibre-optic sensors, a series of output pulses is obtained. A pulse originating from a particular sensor may be isolated by time-demultiplexing and its phase information recovered by phase-demodulation in order to obtain information on physical conditions etc in the vicinity of that sensor.

Conveniently, the means for generating the pairs of optical pulses may comprise
(i) a fibre-coupled laser;
(ii) means for dividing the output of the laser to provide first and second portions thereof;
(iii) first and second acousto-optic modulators arranged to modulate the first and second portions respectively to produce first and second series of output pulses having frequencies $\omega_1$ and $\omega_2$ respectively;
(iv) a delay loop for delaying each pulse of frequency $\omega_2$ with respect to a pulse of frequency $\omega_1$ generated simultaneously therewith;
(v) an output fibre; and
(vi) means for multiplexing the first and second series of pulses onto the output fibre.

According to a yet further aspect of the invention, there is provided apparatus for demodulating a first phase-modulated signal the modulation of which corresponds to a desired signal and noise, the apparatus comprising a phase-demodulation unit arranged to receive the first phase-modulated signal and a second phase-modulated signal the modulation of which corresponds to substantially the noise only. Use of a signal having the same noise characteristics as those of the first signal to demodulate that signal reduces noise in the output of the phase-demodulation unit.

Preferably, the phase-demodulation unit comprises a quadrature phase-demodulator and a QSG as described above, the QSG being arranged to receive the second phase-modulated signal and to output corresponding I and Q signals to the quadrature phase-demodulator, and the quadrature phase-demodulator being arranged to receive the first phase-modulated signal.

Alternatively the phase-demodulation unit may comprise a digital quadrature phase-demodulator (DQPD), a QSG of the invention implemented in digital electronics and including an ADC for digitising a signal input thereto, and an ADC arranged to digitise the first phase-modulated signal prior to input to the DQPD, the QSG being arranged to receive the second phase-modulated signal and to output corresponding I and Q signals to the DQPD.

Alternatively, the phase-demodulation unit may comprise a quadrature phase-demodulator and a Hilbert-transform filter, the Hilbert-transform filter being arranged to receive the second phase-modulated signal and to output corresponding I and Q signals to the quadrature phase-demodulator, and the quadrature phase-demodulator being arranged to receive the first phase-modulated signal.

In this case, the phase-demodulator may be a DQPD, the apparatus further comprising first and second ADCs arranged to digitise the first and second phase-modulated signals prior to their input to the DQPD and the Hilbert-transform filter respectively.

The invention also provides fibre-optic sensing apparatus. The apparatus preferably comprises a reference sensor arranged to generate the second phase-modulated signal. Conveniently, the reference sensor is a desensitised fibre-optic sensor comprised in a serial array of substantially identical individual fibre-optic sensors, the first phase-modulated signal being obtained from one of the fibre-optic sensors in the array other than the reference sensor. The reference sensor may be mechanically desensitised so that detects only noise to which the individual fibre-optics sensors are subjected.

Individual fibre-optics sensors may each include reflecting means for reflecting radiation towards the input of the array after passage of the radiation through a corresponding individual fibre-optic sensor. Conveniently, each reflecting means is a fibre-coupled mirror coupled between two individual fibre-optic sensors.

The fibre-optic sensing apparatus may comprise means for generating pairs of optical pulses and inputting the pulses to the array of fibre-optic sensors, these means being as set out above.

A further aspect of the invention provides a method of generating in-phase (I) and quadrature (Q) signals from an input signal wherein the I and Q signals have substantially the same frequency as the input signal, the method comprising the steps of:
(i) generating a first intermediate signal having an amplitude or magnitude corresponding to the difference between the frequency of the input signal and the I and Q signals;
(ii) generating a second intermediate signal having an amplitude or magnitude corresponding to the rate of change of the amplitude or magnitude of the first intermediate signal; and
(iii) using the second intermediate signal to control the frequency of I and Q signals output by a signal generator such that said frequency deviates towards the frequency of the input signal; and
(iv) feeding back the I and Q signals for use in step (i).

A still further aspect of the invention provides a method of demodulating a first phase-modulated signal having a phase-modulation corresponding to a desired signal and noise, the method comprising the steps of
(i) obtaining a second phase-modulated signal having a modulation corresponding only to the noise; and
(ii) inputting the first and second phase-modulated signals to a phase-demodulation unit.

DESCRIPTION OF FIGURES

Embodiments of the invention are described below by way of example only and with reference to the accompanying drawings in which.

DESCRIPTION OF A PREFERRED EMBODIMENT

Figure 1:
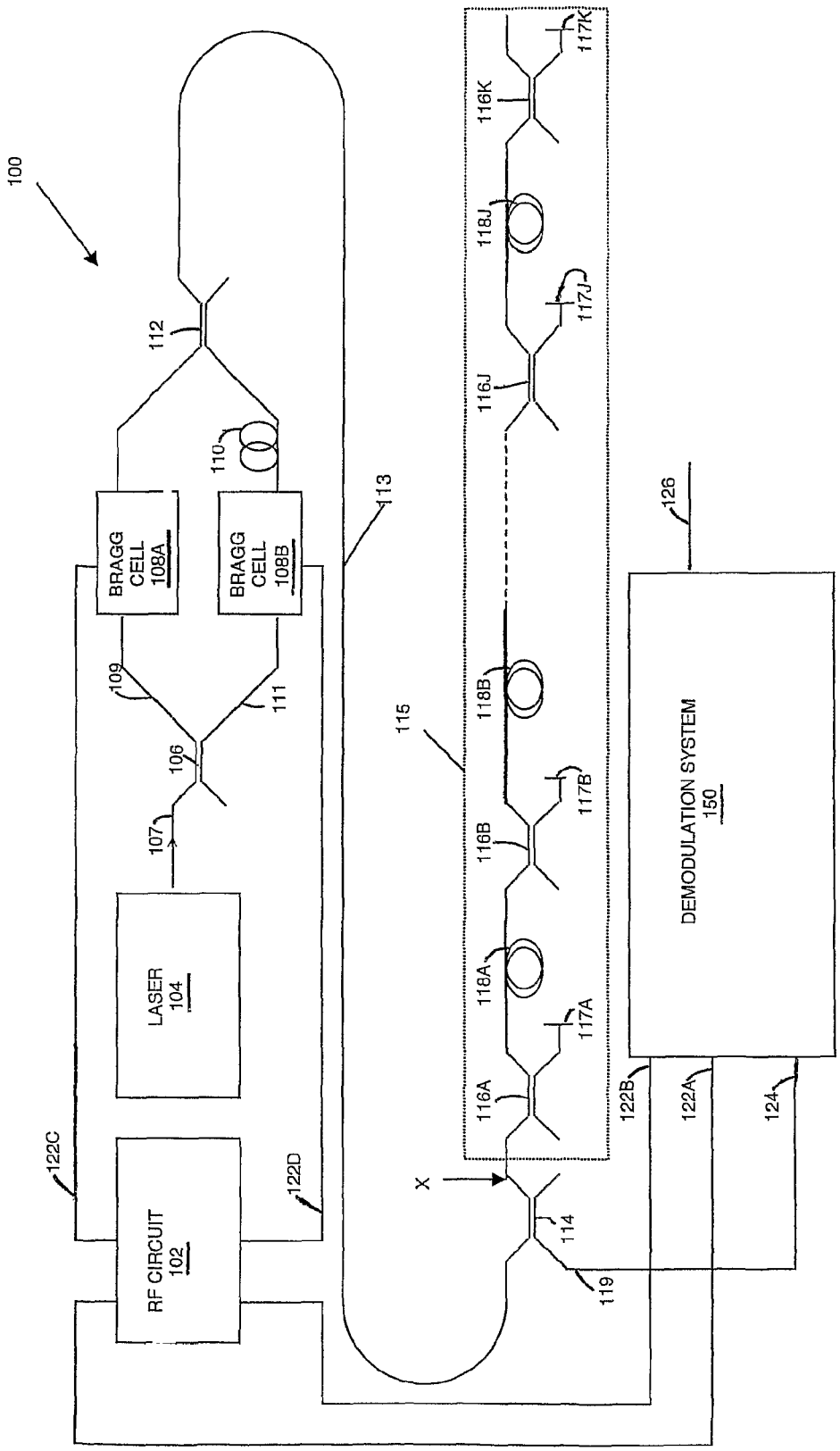
FIG. 1 shows time-division multiplexed (TDM) fibre-optic sensing apparatus of the invention.

In FIG. 1, time-division multiplexed (TDM) fibre-optic sensing apparatus of the invention is indicated generally by 100. The apparatus 100 may be used in a variety of sensing applications, for example, gathering of seismic data or vehicular traffic information, or detection of unauthorised personnel in security applications such as perimeter/area monitoring.

The apparatus 100 comprises a sensor array 115 coupled at one end to an optical source (comprising a GaInAsP/InP semiconductor laser 104) via an optical fibre 113. The sensor array 115 comprises a serial array of ten substantially identical fibre-optic sensors 118A-118J, eleven couplers 116A-116K and eleven mirrors 117A-117K. (For greater clarity, couplers 116C-116I, mirrors 117C-117I and sensors 118C-118I are omitted from FIG. 1). Each end of a given fibre-optic sensor 118 is coupled to a mirror 117 such that radiation coupled to that mirror is reflected back towards the fibre 113. For example, sensor 118A is coupled at one end to mirror 117A by coupler 116A, and at the other end to mirror 117B by coupler 116B. Similarly, sensor 118J is coupled at one end to mirror 117J by coupler 116J and at the other end to mirror 117K by coupler 116K. The mirrors 117 are connected to respective couplers 116 by respective equal lengths of optical fibre. The sensor array 115 is coupled via a coupler 114 and an output fibre 119 to the input 124 of a demodulation apparatus 150.

The optical source of the apparatus 100 comprises a GaInAsP/InP laser 104 coupled to two acousto-optic modulators (Bragg cells) 108A, 108B which are driven by gated signals (122C and 122D respectively) from an RF circuit 102. Continuous versions of signals 122C and 122D are also supplied to respective inputs 122A, 122B of the demodulation system 150.

Optical radiation of wavelength of 1550 nm is output from the laser 104 and coupled into an optical fibre 107. The radiation is divided by an optical coupler 106 into two portions which pass to respective Bragg cells 108A, 108B via fibres 109, 111 respectively. The Bragg cells 108A, 108B are driven by RF circuit 102 and modulate input radiation from the laser 104 to produce pulsed, frequency-shifted output radiation having frequencies $\omega_1$ and $\omega_2$ respectively, where $\omega_1-\omega_2=\Omega$ is of the order of a few MHz. A pulse output from cell 108B is delayed with respect to a pulse output simultaneously from cell 108A by a delay loop 110 which introduces a delay $\tau$ (e.g. a few tens of ns) where $\tau/2$ is the difference in time taken by two parts of a pulse divided by a coupler 116 in the array 115 to reach consecutive following mirrors along the array 115. For example, $\tau/2$ is the difference between the time taken for one part of a pulse divided at coupler 116A to reach mirror 117A and the time taken for a portion of the other part to reach mirror 117B via coupler 116B. Pulses output from Bragg cell 108A and delay loop 110 are coupled into fibre 113 via coupler 112.

Radiation within the fibre 113 thus comprises a series of pairs of pulses wherein the first pulse in each pair has a frequency $\omega_1$ and the second pulse in each pair has a frequency $\omega_2$, the second pulse being delayed with respect to the first by a delay $\tau$ and wherein $\omega_1-\omega_2=\Omega$ is of the order of a few MHz and $\tau$ is of the order or a few tens of ns.

A particular pair of pulses entering the sensor array 115 via fibre 113 is successively divided at couplers 116A-116K. For example, a pair of pulses input to the sensor array 115 is divided into two pairs by coupler 116A; one pair passes to mirror 117A and is reflected back towards the fibre 113; the other pair passes through individual sensor 118A and is then itself divided by coupler 117B to produce two new pairs of pulses. One of these two new pairs of pulses is reflected by mirror 117B back towards the fibre 113. Since the difference in the time taken for a pulse to reach the first and second mirrors immediately after division by a coupler is $\tau/2$, pairs of pulses reflected back towards the fibre 113 by these consecutive mirrors have a relative delay $\tau$; therefore on recombination by that coupler a pulse at frequency $\omega_2$ reflected by the first mirror will coincide temporally with a pulse at frequency $\omega_1$ reflected by the second mirror. In addition to a frequency difference $\omega_1-\omega_2=\Omega$ the temporally coinciding pulses have a phase difference corresponding to a phase shift introduced by the individual sensor located between the first and second mirrors. This phase information is recovered by the demodulation system 150 and output at 126, and gives information on physical conditions at the location of the individual sensor. For example, the phase information could correspond to the acceleration of an individual sensor where the array 115 is deployed to gather seismic data.

Following input of each pair of pulses of frequency $\omega_1$, $\omega_2$ to the array 115, a sequence of 12 pulses is output from the array 115 and coupled into an optical fibre 119. The output pulses are spaced apart in time by $\tau$. The first of the 12 pulses is a pulse of frequency $\omega_1$ reflected by mirror 117A. Each of the second to eleventh pulses comprises a first component pulse of frequency $\omega_1$ temporally aligned with a second component pulse of frequency $\omega_2$, these two pulses having been reflected from mirrors located at opposite ends of an individual sensor 118 Specifically, the first component pulse of frequency $\omega_1$ is reflected from the mirror at the end of the individual sensor remote from the fibre 113, whereas the second component pulse of frequency $\omega_2$ is reflected from the mirror at the end of the individual sensor nearest the fibre 113. The phase difference between the first and second component pulses arises from the alteration of the phase of the first component pulse within the individual sensor 118. The ith pulse ($2 \leq i \leq 11$) in a particular output sequence contains phase information from the (i-1)th individual sensor in the array 115. The twelfth pulse is a pulse of frequency $\omega_2$ reflected from mirror 117K.

In order to gather information from a particular individual sensor, the corresponding pulse in each output sequence is observed over a period of time by time-demultiplexing the output pulse sequences. For example, to gather information from the fifth individual sensor 118E, the sixth pulse in each pulse output sequence is monitored. Demultiplexing is carried out by the demodulation system 150. The Bragg cells 108A, 108B are operated such that the period of the pairs of pulses input to the array 115 (i.e. the delay between consecutive pulses at frequency $\omega_1$ for example) is sufficiently long to ensure that the twelfth pulse in a series of output pulses is coupled out of the array 115 into the fibre 119 before the next pair of pulses output by the cells 108A, 108B is introduced into the array 115.

Figure 2:
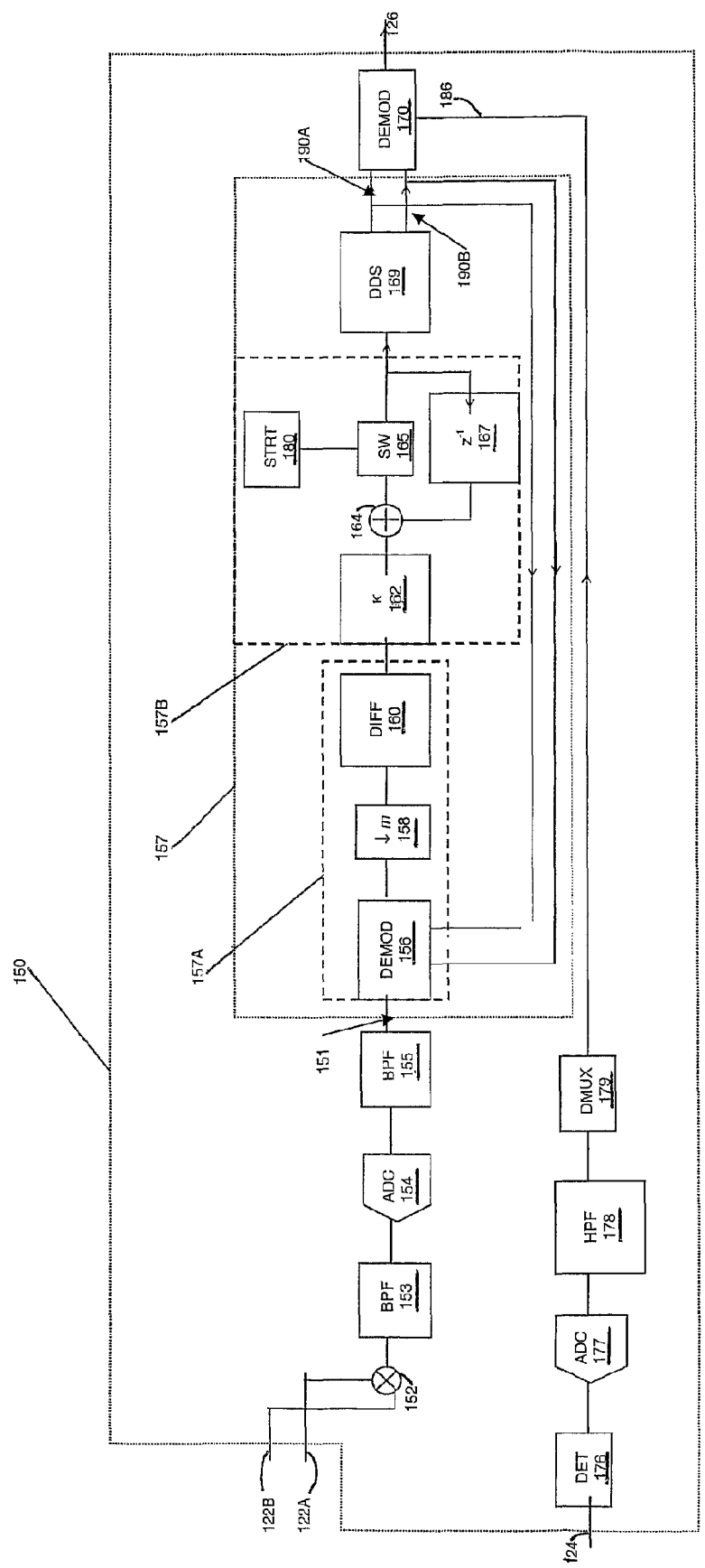
FIG. 2 schematically illustrates demodulation apparatus of the invention for use in the FIG. 1 apparatus.

FIG. 2 schematically illustrates the demodulation apparatus 150. Processing of signal within the apparatus 150 is carried out digitally under control of a single clock (not shown). RF signals from the RF circuit 102 are connected to inputs 122A, 122B of the system 150. Optical output from the array 150 is coupled to an optical input 124 of the system 150 and detected by a detector 176. Output from the detector 176 is digitised by an analogue-to digital converter (ADC) 177 and filtered by a high-pass filter 178. A time-demultiplexer 179 allows pulses carrying information from a particular individual sensor in the array 115 to be interrogated. In the case of any of the second to eleventh pulses in a particular sequence of output pulses from the array 115, the signal output from the demultiplexer 179 varies as $\cos(\Omega t + \phi + \epsilon)$ where $\Omega = \omega_1 - \omega_2$, $\phi$ is the phase information from the particular individual sensor under interrogation and $\epsilon$ is a phase term representing the combined effects of phase noise associated with the difference frequency $\Omega$ and in the phase change $\phi$ detected by the particular sensor under interrogation. This phase noise is $1/f$ in nature, i.e. it is low frequency noise. The output of the demultiplexer 179 is input to a demodulator unit 170 (a digital quadrature demodulator), which is identical to demodulator unit 156.

Figure 3:
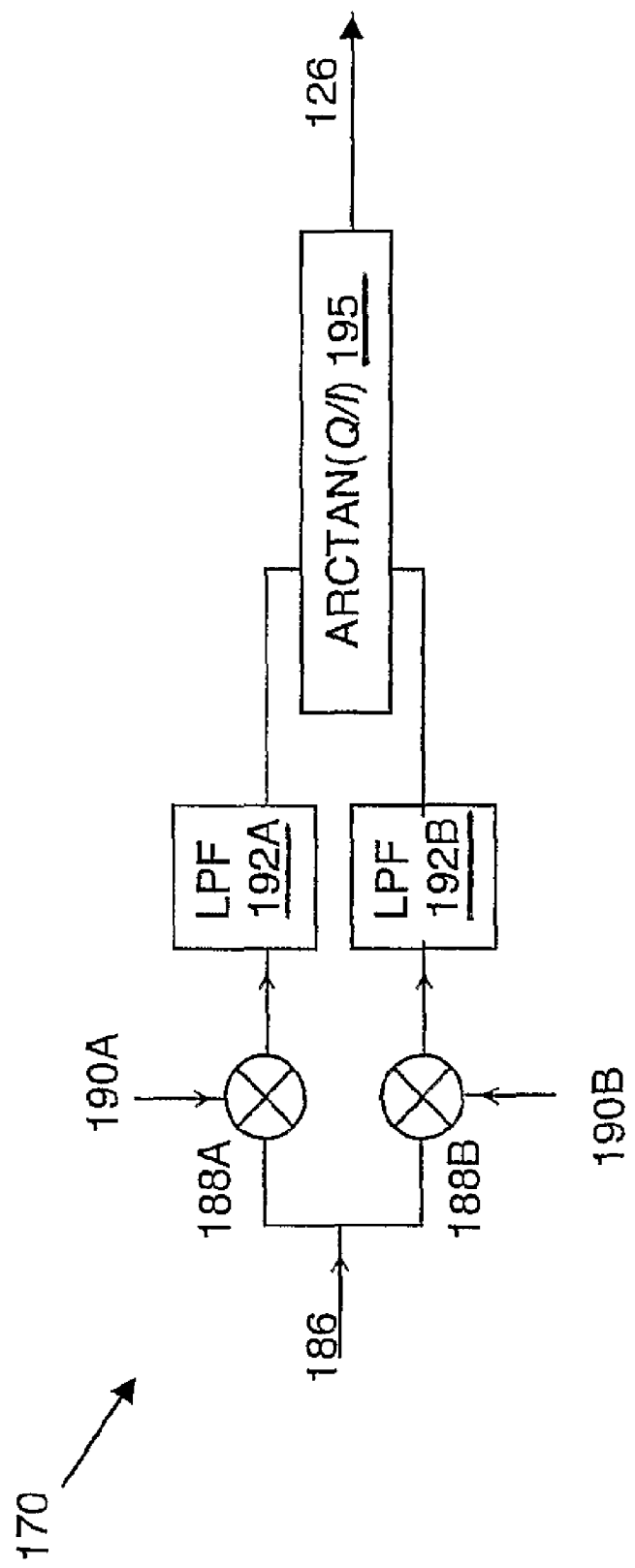
FIG. 3 shows an individual demodulator unit used in the FIG. 2 apparatus.

Demodulator unit 170 is shown in detail in FIG. 3. The unit 170 is a digital phase-quadrature demodulator (DPQD), and comprises an input 186, two mixers 188A, 188B, two low pass filters 192A, 192B, a device 195 for performing an arctan function, and an output 126. An input signal of the form $\cos(\Omega t + \phi + \epsilon)$ from the demultiplexer 179 input at 186 is mixed with each of two unmodulated signals of equal amplitude having the form $\cos \Omega t$ and $\sin \Omega t$ input to inputs 190A, 190B of mixers 188A, 188B respectively. The amplitude of the output from the mixer 188A has a component with an amplitude proportional to $\cos(\phi+\epsilon)$. Output from mixer 188B has a component with an amplitude proportional to $\sin(\phi+\epsilon)$. Low pass filters 192A, 192B remove signal components of frequency $2\Omega$. Signals output from the mixers 192A, 192B are input to the device 195 to produce a signal with an amplitude proportional to $(\phi+\epsilon)$ at the output 126 of the demodulator unit 170 (which is also the output of the demodulation apparatus 150).

Referring again to FIG. 2, the two unmodulated signals of frequency $\Omega$ are generated by means of a quadrature signal generator (QSG) 157. A first portion 157A of the QSG 157 comprises a second demodulator 156, a rate-converter 158, and a digital differentiator 160. A second portion 157B of the QSG 157 comprises an amplifier 162, an initialisation switch 165, a start buffer 180 and a delay unit 167. A direct digital synthesiser (DDS) 169 forms a third portion of the QSG 157. The input signal to the QSG 157 is produced by mixing the output signals from the RF circuit 102 to produce a signal of frequency $\Omega$, these signals being applied to inputs 122A, 122B of the demodulation system 150. The signals are mixed at a mixer 152 the output of which is passed to a band-pass filter 153 to remove its sum-frequency component, and the resulting signal is digitised by an ADC 154. The output from the ADC 154 is input to a band-pass filter 155, the output of which is connected to the input 151 of the QSG 157. The QSG 157 generates in-phase (I) and quadrature-phase (Q) signals corresponding to the signal at 151, these signals being the unmodulated signals $\sin \Omega t$, $\cos \Omega t$ which are input to the demodulator unit 170.

Demodulator unit 156 has the same structure as that of demodulator unit 170. The signals input to the inputs 190A, 190B of demodulator unit 170 are also fed back to corresponding inputs of demodulator unit 156. The output from the demodulator 156 is down-converted by a factor m by rate-converter 158 and then passed to a low-pass digital differentiator 160. The signal input to the differentiator 160 is at a rate of $1/m$ of the clocking frequency of the demodulator 156. The output from the first portion 157A of the QSG 157 is a first intermediate signal having a magnitude proportional to the difference in frequency between the unmodulated signals at 190A, 190B and the signal at 151 which is input to the first portion 157A.

The output from the first portion 157A of the QSG 157 is amplified by a factor $\kappa$ by an amplifier 162 and passed to a second differentiator which consists of a summer 164, initialisation switch 165 and a delay function 167. The output signal from the second portion 157B of the QSG 157 is a second intermediate signal used to control a direct digital synthesiser (DDS) (or numerical control oscillator) 169 which generates sine and cosine signals $\sin \Omega t$, $\cos \Omega t$ for input to inputs 190A, 190B of demodulator unit 170 and the equivalent inputs of demodulator unit 156. The frequency of the sine and cosine signals $\sin \Omega t$, $\cos \Omega t$ is controlled by the signal input to the DDS. The output of the second portion 157B of QSG 157 is a second intermediate signal having a magnitude proportional to the rate of change of the magnitude of the first intermediate signal.

If the signal at input 151 of demodulator 156 differs in frequency by an amount $\Delta f$ from the frequency of the signals fed back to demodulator 156 from equivalent inputs 190A, 190B of demodulator 170, the output of demodulator 156 is linear with slope $2\pi\Delta f$. The down-converter 158 operates to place higher frequency components in the output signal of the demodulator 156 outside the pass band of the digital differentiator 160, which effectively returns the slope $2\pi\Delta f$ as well as low frequency AC components. The noise power $\sigma_{diff}^2$ passed by the differentiator 160 is related to the white noise input power $\sigma_\epsilon^2$ by $\sigma_{diff}^2 = (\pi^3/3)F_c^3\sigma_\epsilon^2$, where $F_c$ is the cut-off frequency of the differentiator 160. The amplifier 162 is inverting, i.e. $\kappa<0$, so that the output $\epsilon_t$ of the initialisation switch 165 at time t is related to its output $\epsilon_{t-1}$ at its previous cycle (at time $t-1$) by $\epsilon_t = \epsilon_{t-1} - 2|\kappa|\pi\Delta f$. The second portion 157B of the QSG 157 operates as a wide-band differentiator. The output of the switch 165 is input to the DDS 169 and therefore controls the frequencies of the signals input to the mixers of demodulator unit 170, these signals also being fed back to equivalent mixers in the demodulator 156. The control signal input to the DDS 169 represents the rate at which the slope $2\pi\Delta f$ changes, thus providing fast second order correction and frequency tracking. In order to provide stable operation of the QSG 157 during start-up, an initial preset control value is supplied to the initialisation switch 165 by a start buffer 180, whilst the switch 165 is open.

In operation of the demodulation system 150, the I and Q signals output by the DDS 169 (proportional to $\sin \Omega t$ and $\cos \Omega t$ respectively) and input at 190A, 190B to the demodulator 170, track the frequency $\Omega$ of the signal input to the QSG 157 at 151, however they do not incorporate high frequency noise generated by mixing at the mixer 152.

Figure 4:
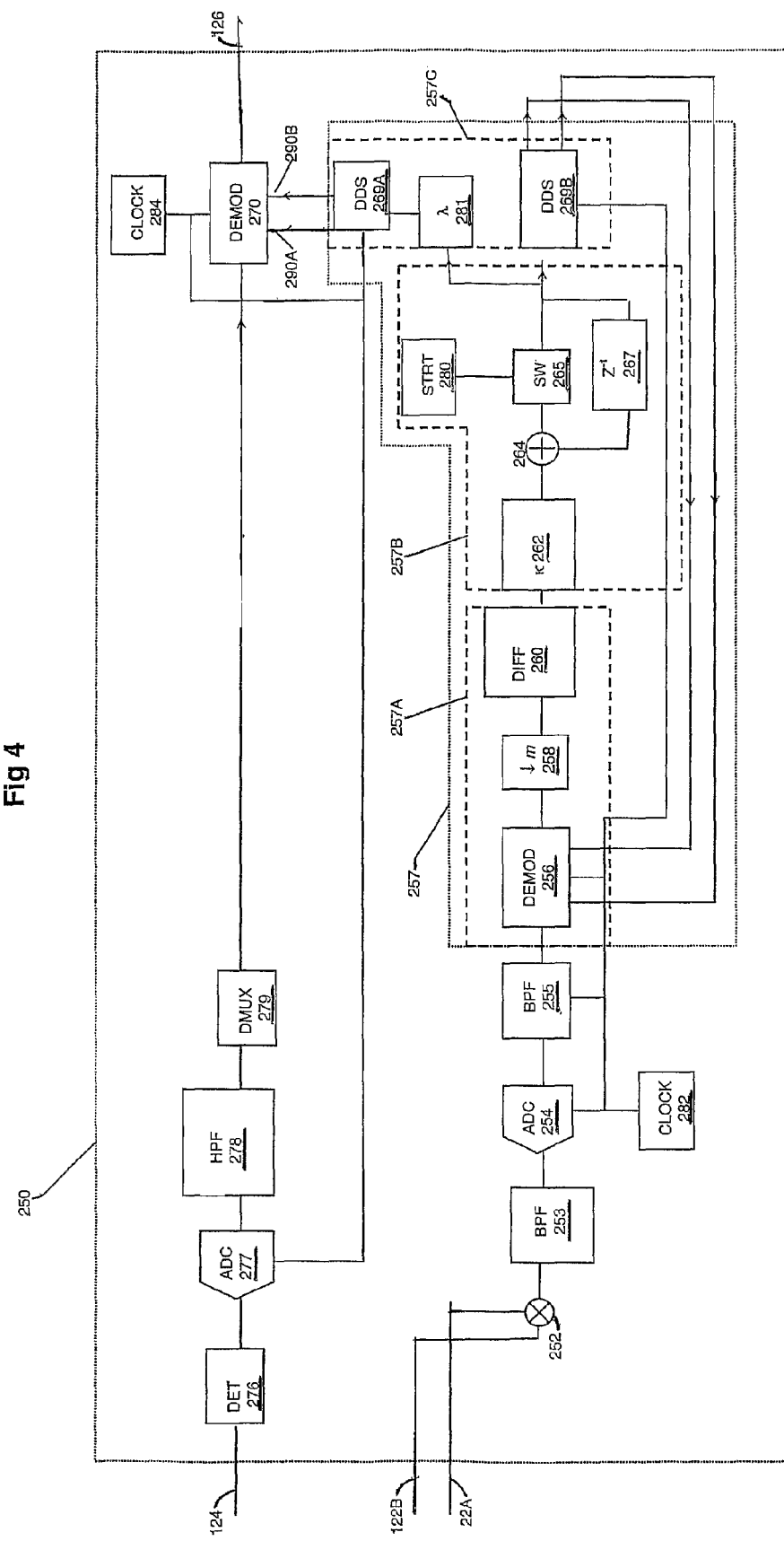
FIG. 4 schematically illustrates further demodulation apparatus of the invention for use in the FIG. 1 apparatus.

FIG. 4 schematically illustrates an alternative demodulation apparatus 250 for use in the FIG. 1 apparatus. Parts of the apparatus 250 which correspond to parts in the apparatus 150 are labelled with reference signs which differ by a value of 100 from those labelling the corresponding components in FIG. 1. The apparatus 250 has a QSG 257 which corresponds to the QSG 157 in FIG. 1 and comprises first 257A, second 257B portions and third 257C portions. The apparatus 250 is controlled by two clocks 282, 284 and the third portion 257C of the QSG 257 comprises two direct digital synthesisers 269A, 269B and a rate converter 281. Clock 282 controls the clocking speed of ADC 254, band-pass filter 255, demodulator unit 256 and DDS 269B. Clock 284 controls the clocking speed of ADC 277, demodulator unit 270 and DDS 269A.

The basic functioning of the apparatus 250 is the same as that of the apparatus 150 of FIG. 2. Optical output pulses from the array 115 (FIG. 1) are detected at a detector 276, digitised by ADC 277, filtered by high-pass filter 278 and demultiplexed by demux 279. The output of demux 279 comprises a signal of the form $\cos(\Omega t+\phi+\epsilon)$ the phase component $\phi+\epsilon$ of which is recovered by demodulator unit 270 and output at 126. In operation of the system 250, the frequency of I and Q signals output from the DDS 269B tracks the frequency of the input to the QSG 257, this input being generated by mixing signals from RF circuit 102 and filtering to remove the resulting sum-frequency component. In contrast to the apparatus 150, the output of the initialisation switch 265 is not only used to control DDS 269B (which provides feedback within the quadrature signal generator (QSG) 257) but it is also rate-converted by a second rate converter 281 and subsequently input to a second DDS 269A at clocking speed compatible with clock 284. Converter 281 also scales the signal from switch 265 by a factor $\lambda$ which is set to value suitable for controlling DDS 269A prior to operation of the apparatus 250. The apparatus 250 provides enhanced flexibility in frequency tracking and demodulation when these two operations are clocked at different rates. Demodulator unit 270 has inputs 290A, 290B for receiving I and Q signals from the DDS 269A.

Figure 5:
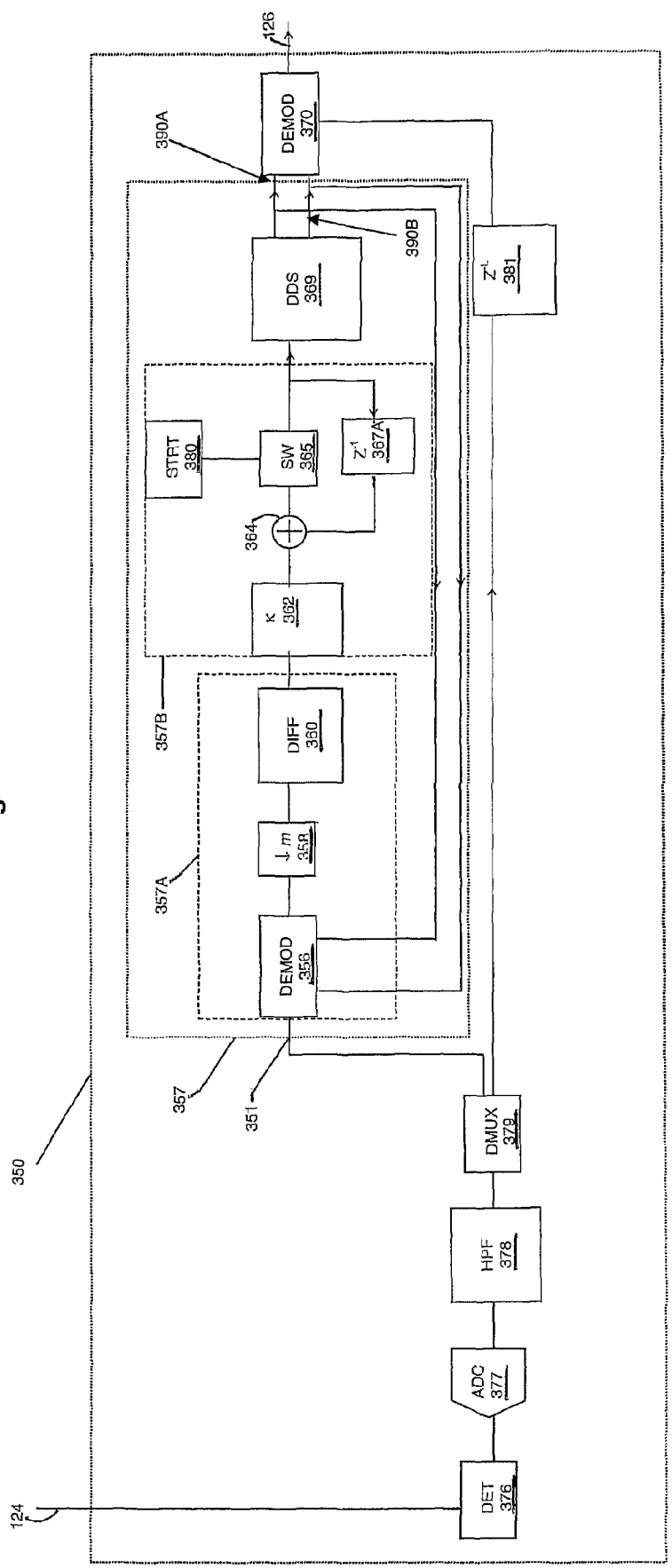
FIGS. 5 and 6 schematically illustrate further demodulation apparatus of the invention for providing a demodulated output signal having reduced noise.

FIG. 5 schematically illustrates another demodulation apparatus 350 of the invention which is also suitable for use in the FIG. 1 apparatus, when one of the individual sensors 118 of the array 115 is mechanically desensitised to signals that may be detected by the other sensors whilst still being able to detect noise that is detected by the others sensors. The desensitised sensor is then a reference sensor which detects noise only. The system 350 operates to provide a low-noise output signal at 126 corresponding to the phase of signals obtained from one of the other sensors in the array 115.

Parts of the apparatus 350 which correspond to parts in the apparatus 150 are labelled with reference signs which differ by a value of 200 from those labelling the corresponding components in FIG. 1. The demodulation apparatus 350 has a single (optical) input 124 and an output 126. In contrast to the systems 150, 250 there is no input of Bragg cell driving signals from RF circuit 102. Output pulses from the array 115 are detected (376), digitised (377), high-pass filtered (378) and demultiplexed (379) as described above. The apparatus 350 comprises a quadrature signal generator 357 having first 357A and second 357B portions, and a third portion consisting of single DDS 369.

Signals from the reference sensor are selected by demux 379 for input to quadrature signal generator (QSG) 357 which outputs corresponding in-phase (I) and quadrature (Q) signals to a phase-quadrature demodulator 370. Signals from the other sensors are sequentially demuxed and input to the demodulator 370 after being delayed by delay means 381 by a time delay equal to the processing delay introduced by the loop 357. Since each of the signals input to the demodulator contains the same phase noise component, and since the I and Q signals contain no other phase-modulation, the output of the demodulator 370 corresponds closely to the phase imposed on signals at the sensor whose output signal is selected by demux 379 and input to demodulator 370 via the delay means 381. In other words, the signal input to the QSG 357 has the form $\cos[\Omega t+\epsilon(t)]$ where $\epsilon(t)$ corresponds to noise detected by all the sensors in the array 115, and the signal input to the DPQD 370 via the delay means 381 has the form $\cos[\Omega t+\phi(t)+\epsilon(t)]$ where $\phi(t)$ is a phase-modulation which it is desired to detect. Since the signal used for demodulation (i.e. the signal from the desensitised sensor) also contain the noise term, the signal output from the DPQD 370 is substantially only a function of $\phi(t)$.

Figure 6:
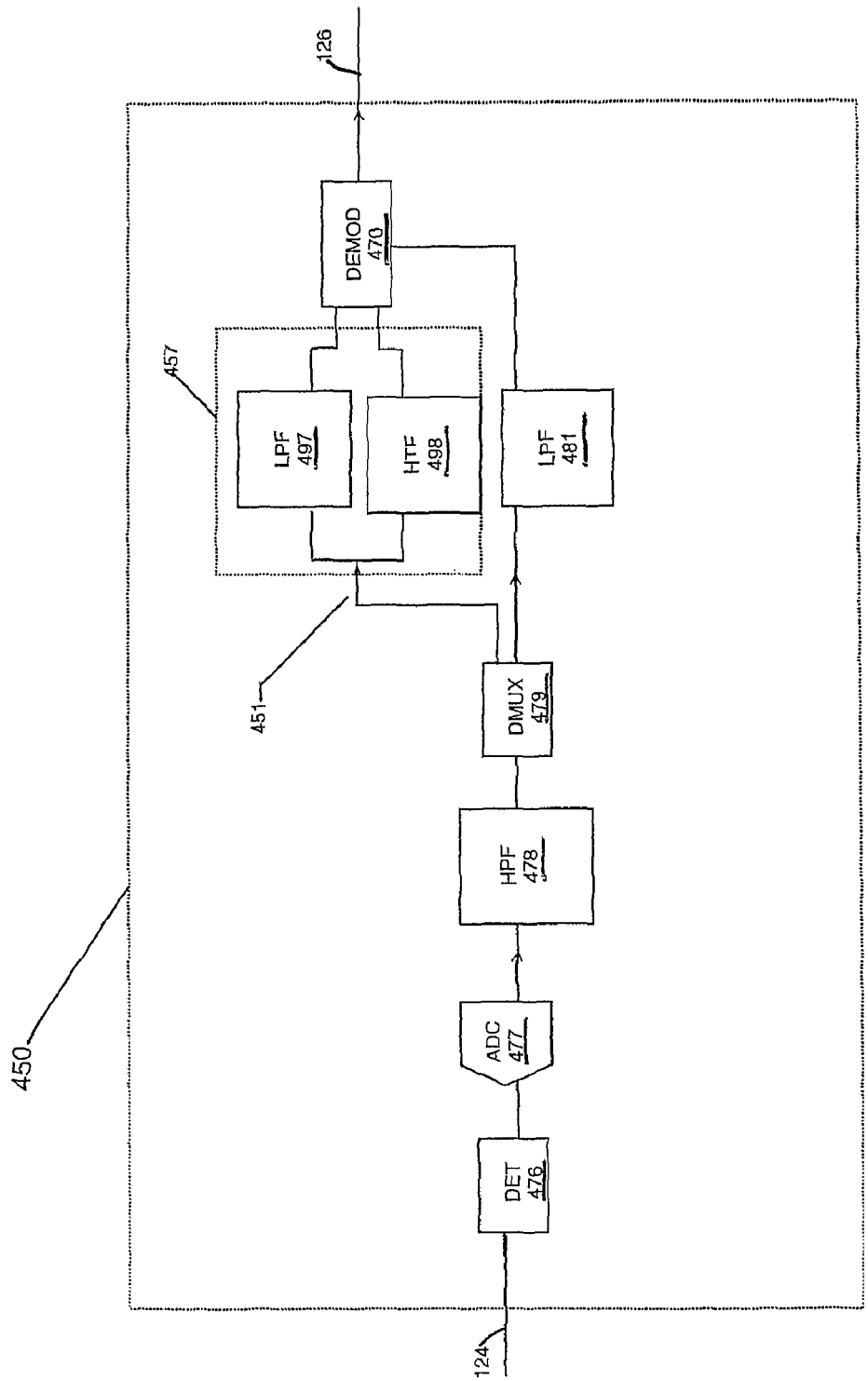

FIG. 6 shows another demodulation apparatus 450 of the invention for use in the FIG. 1 system, the apparatus 450 being an alternative to the apparatus 350. Parts of the apparatus 450 which correspond to parts in the apparatus 150 are labelled with reference signs which differ by a value of 300 from those labelling the corresponding components in FIG. 1. As with the apparatus 350 of FIG. 5, the apparatus 450 is intended for use with an array 115 in which one of the sensors is used as a reference sensor for detecting only noise in the general vicinity of the array 115. Signals originating from the reference sensor are demuxed (479) and input at 451 to a QSG 457 having both a low-pass filter 497 and a Hilbert Transform filter 498. Filter 498 shifts the phase of the signal at 451 by 90°. In-phase (I) and quadrature-phase (Q) signals corresponding to the signal at 451 are output from filters 497, 498 respectively and applied to inputs of mixers within demodulator unit 470 to demodulate signals originating from other sensors in the array 115, these being input to the demodulator 470 via a low-pass filter 481. Use of a signal originating from the reference sensor to carry out demodulation of signals originating from other sensors in the array removes phase-noise that would otherwise appear in the output at 126.

The invention claimed is:

1. Fibre-optic sensing apparatus including apparatus for demodulating a first phase-modulated signal the modulation of which corresponds to a desired signal and noise, the apparatus including a reference sensor arranged to generate a second phase-modulated signal, and further comprising a phase-demodulation unit arranged to receive the first phase-modulated signal and a second phase-modulated signal the modulation of which corresponds to substantially the noise only, said demodulation unit comprising:
   a quadrature signal generator (QSG) implemented in digital electronics, arranged to receive the second phase modulated signal and to output corresponding I and Q signals;
   a digital quadrature phase-demodulator (DQPD) adapted to mix said I and Q signals with said first modulated signal to produce an output proportional to said desired signal; and
   an analog to digital converter (ADC) arranged to digitize the inputs to the DQPD and QSG.

2. The apparatus of claim 1 wherein the phase-demodulation unit comprises a quadrature signal generator (QSG), adapted to:
   (i) generate a first intermediate signal having an amplitude or magnitude proportional to the difference between the frequency of the second phase-modulated signal and the frequency of the I and Q signals;
   (ii) generate a second intermediate signal in response to input of the first intermediate signal, the second intermediate signal having a magnitude proportional to the rate of change of the magnitude of the first intermediate signal; and
   (iii) generate I and Q signals in response to input of the second intermediate signal and adjust the frequency of the I and Q signals such that said frequency tends towards that of the second phase-modulated signal,
   wherein said QSG is arranged for feedback of the I and Q signals.

3. The apparatus of claim 1 wherein the phase-demodulation unit comprises a quadrature phase-demodulator and a Hilbert-transform filter, the Hilbert-transform filter being arranged to receive the second phase-modulated signal and to output corresponding I and Q signals to the quadrature phase-demodulator, and the quadrature phase-demodulator being arranged to receive the first phase-modulated signal.

4. The apparatus of claim 3 wherein the apparatus further comprises first and second ADCs arranged to digitise the first and second phase-modulated signals prior to their input to the DQPD and the Hilbert-transform filter respectively.

5. The apparatus of claim 1 wherein the reference sensor is a desensitised fibre-optic sensor comprised in a serial array of substantially identical individual fibre-optic sensors, the first phase-modulated signal being obtained from one of the fibre-optic sensors in the array other than the reference sensor.

6. The apparatus of claim 5 wherein the reference sensor is mechanically desensitised.

7. The apparatus of claim 5 wherein the fibre-optic sensors each incorporate reflecting means for reflecting radiation towards the input of the array after passage of the radiation through a corresponding individual fibre-optic sensor.

8. The apparatus of claim 7 wherein each reflecting means is a fibre-coupled mirror coupled between two individual fibre-optic sensors.

9. The apparatus of claim 7 further comprising means for generating pairs of at least partially coherent optical pulses in response to first and second RF signals having a frequency difference $\Omega$ and means for inputting the pairs of pulses to the sensor, wherein the pulses of each pair have frequency difference $\Omega$ and a relative delay $\tau$, and wherein the difference in path length from consecutive reflecting means to the input of the array is substantially $c\tau/2$, where c is the speed of pulses in the fibre.

10. The apparatus of claim 9 wherein the means for generating the pairs of optical pulses comprises
 (i) a fibre-coupled laser;
 (ii) means for dividing the output of the laser to provide first and second portions thereof;
 (iii) first and second acousto-optic modulators arranged to modulate the first and second portions respectively to produce first and second series of output pulses having frequencies $\omega_1$ and $\omega_2$ respectively;
 (iv) a delay loop for delaying each pulse of frequency $\omega_2$ with respect to a pulse of frequency $\omega_1$ generated simultaneously therewith;
 (v) an output fibre; and
 (vi) means for multiplexing the first and second series of pulses onto the output fibre.

11. A method of demodulating a first phase-modulated signal received from a fibre optic sensing apparatus, and having a phase-modulation corresponding to a desired signal and noise, the method comprising the steps of
 (i) obtaining from a reference sensor a second phase-modulated signal having a modulation corresponding only to the noise; and
 (ii) inputting the first and second phase-modulated signals to a phase-demodulation unit, said method further including:
  digitizing the first and second phase-modulated signals at an ADC;
  receiving the second phase-modulated signal at a digitally implemented quadrature signal operator (QSG) and outputting corresponding I and Q signals to a digital quadrature phase-demodulator (DQPD); and
  mixing said I and Q signals with said first phase modulated signal at a digital quadrature phase-demodulator (DGPD) to produce a demodulated output proportional to said desired signal.

12. A quadrature signal generator (QSG) for receiving an input signal and generating in-phase (I) and quadrature-phase (Q) signals of substantially the same frequency as the input signal in response thereto, wherein the QSG comprises
 (i) a first portion for generating a first intermediate signal in response to input of the input signal, the first intermediate signal having an amplitude or magnitude proportional to the difference between the frequency of the input signal and the frequency of the I and Q signals;
 (ii) a second portion for generating a second intermediate signal in response to input of the first intermediate signal, the second intermediate signal having a magnitude proportional to the rate of change of the magnitude of the first intermediate signal; and
 (iii) a signal generator for generating the I and Q signals in response to input of the second intermediate signal and adjusting the frequency of the I and Q signals such that said frequency tends towards that of the input signal, the signal generator being arranged for feedback of the I and Q signals to the first portion.

13. The QSG of claim 12, implemented in digital electronics and further comprising an analogue-to-digital converter (ADC) arranged to digitise an input signal prior to its input to said first portion.

14. The QSG of claim 13 wherein said first portion comprises a digital phase-quadrature demodulator (DPQD) arranged to receive the digitised input signal and the I and Q signals and having its output connected to the input of a rate down-converter the output of which is connected to the input of a digital differentiator having a cut-off frequency which excludes high-frequency content in the input signal.

15. The QSG of claim 13 wherein said second portion comprises
 (i) an inverting amplifier arranged to receive the first intermediate signal;
 (ii) a summer having a first input connected to the output of the amplifier; and
 (iii) delay means connected between the output of the summer and a second input thereof;
 the output of the summer being input to the signal generator.

16. The QSG of claim 15 wherein the second portion further comprises an initialisation switch and a start buffer, the initialisation switch being connected to the output of the summer and the delay means connecting the output of the switch to the second input of the summer, the output of the initialisation switch being input to the signal generator and being controllable by the start buffer.

17. The QSG of claim 13 wherein the signal generator is a direct digital synthesiser (DDS) arranged to generate the I and Q signals in response to input of the second intermediate signal.

18. The QSG of claim 13 further comprising a rate down-converter and a second signal generator, the downconverter being arranged to receive the second intermediate signal and to output a downconverted signal to the second signal generator which is arranged to provided second I and Q output signals in response to input of the downconverted signal.

19. The QSG of claim 18 wherein the second signal generator is a direct digital synthesiser (DDS).

20. Demodulation apparatus comprising a QSG according to claim 12.

21. The apparatus of claim 20 further comprising a quadrature phase-demodulator arranged to receive the I and Q signals.

22. Fibre-optic sensing apparatus comprising the demodulation apparatus of claim 20.

23. The apparatus of claim 22 further comprising a serial array of substantially identical individual fibre-optic sensors each incorporating reflecting means for reflecting radiation towards the input of the array after passage of the radiation through a corresponding individual fibre-optic sensor.

24. The apparatus of claim 23 wherein each reflecting means is a fibre-coupled mirror coupled between two individual fibre-optic sensors.

25. The apparatus of claim 23 wherein one of the individual sensors comprises means arranged to desensitise that sensor to signals capable of detection by the remaining sensors but to allow that sensor to detect noise which may be detected by the other sensors.

26. The apparatus of claim 23 further comprising means for generating pairs of at least partially coherent optical pulses in response to first and second RF signals having a frequency difference $\Omega$ and means for inputting the pairs of pulses to the array, wherein the pulses of each pair have frequency difference $\Omega$ and a relative delay $\tau$ and the difference in path length from consecutive reflecting means to the input of the array is substantially $c\tau/2$, where c is the speed of pulses in the fibre.

27. The apparatus of claim 26 wherein the means for generating the pairs of optical pulses comprises
   (i) a fibre-coupled laser;
   (ii) means for dividing the output of the laser to provide first and second portions thereof;
   (iii) first and second acousto-optic modulators arranged to modulate the first and second portions respectively to produce first and second series of output pulses having frequencies $\omega_1$ and $\omega_2$ respectively;
   (iv) a delay loop for delaying each pulse of frequency $\omega_2$ with respect to a pulse of frequency $\omega$ generated simultaneously therewith;
   (v) an output fibre; and
   (vi) means for multiplexing the first and second series of pulses onto the output fibre.

28. A method of generating in-phase (I) and quadrature (Q) signals from an input signal wherein the I and Q signals have substantially the same frequency as the input signal, the method comprising the steps of:
   (i) generating a first intermediate signal having an amplitude or magnitude corresponding to the difference between the frequency of the input signal and the I and Q signals;
   (ii) generating a second intermediate signal having an amplitude or magnitude corresponding to the rate of change of the amplitude or magnitude of the first intermediate signal; and
   (iii) using the second intermediate signal to control the frequency of I and Q signals output by a signal generator such that said frequency deviates towards the frequency of the input signal; and
   (iv) feeding back the I and Q signals for use in step (i).

* * * * *